United States Patent [19]

Hughes

[11] 4,342,649

[45] Aug. 3, 1982

[54] UPFLOW REACTOR FILTER ASSEMBLY

[76] Inventor: Charles D. Hughes, 1045 4th St. N., Brandon, Manitoba, Canada, R7A 2N5

[21] Appl. No.: 234,879

[22] Filed: Feb. 17, 1981

[30] Foreign Application Priority Data

Mar. 3, 1980 [GB] United Kingdom ................ 8007169

[51] Int. Cl.³ ............................................ B01D 41/02
[52] U.S. Cl. ................................. 210/108; 210/128; 210/202; 210/258; 210/262; 210/275; 210/290
[58] Field of Search ............... 210/617, 618, 793, 108, 210/123, 128, 202, 207, 218, 258–262, 275, 290, 291, 293

[56] References Cited

U.S. PATENT DOCUMENTS

| | | | |
|---|---|---|---|
| 3,419,491 | 12/1968 | Messa | 210/715 |
| 3,524,810 | 8/1970 | Mackrle et al. | 210/715 |
| 3,534,855 | 10/1970 | Guillerd et al. | 210/793 |
| 3,549,012 | 12/1970 | Mackrle et al. | 210/108 |
| 3,820,658 | 6/1974 | Cruze, Jr. | 210/108 |
| 4,282,105 | 8/1981 | Crowe | 210/108 |

FOREIGN PATENT DOCUMENTS 1142797 1/1963 Fed. Rep. of Germany ...... 210/275

*Primary Examiner*—Peter A. Hruskoci
*Attorney, Agent, or Firm*—Stanley G. Ade

[57] ABSTRACT

The upflow filter assembly includes a primary chamber situated above a secondary chamber within an enclosure and having a filter element spanning the primary chamber towards the upper end thereof. Airlocks are situated near the dividing floor of the two chambers so that when in the liquid treating or filtering mode, they operate to maintain the air/liquid interface between the chambers and prevent liquid from passing into the secondary chamber assisted by compressed air introduced into the secondary chamber. Liquid containing solids and/or flocculents, is fed into the primary chamber adjacent the lower side thereof and gradually fills the chamber with much of the flocculents and solids settling out by gravity. The partially deflocculated liquid then passes up through the filter element to a height above the filter element with excess, relatively clear effluent flowing out through an outlet spaced above the filter element to provide a hydraulic head above the filter element. As the liquid passes upwardly, it passes through the flocculent mat formed in the primary chamber which also acts as a filter. When it is desired to flush the filter assembly, the secondary chamber is opened to the atmosphere through a conduit extending upwardly through the filter assembly, and the compressed air is closed off. This releases the airlocks and the liquid and sludge from the primary chamber flushes through the airlocks into the secondary chamber and then through an outlet to be discharged. The hydraulic head of liquid above the filter element flushes downwardly through the filter element and assists in cleansing same.

15 Claims, 2 Drawing Figures

UPFLOW REACTOR FILTER ASSEMBLY

BACKGROUND OF THE INVENTION

This is a device for treating liquids which, due to either biochemical action or having chemicals added, form a floc that settles by gravity and where there is an advantage in the liquid to be treated, passing upwardly through this floc blanket. The partially treated liquid then passes upwardly through a filter that retains some of the remaining suspended solids in the liquid.

The filter is designed to filter liquids on a continuous basis and is capable of operating in two modes. Firstly, the filtering or treatment mode where the liquid passes continuously upwardly through the floc blanket, through a filter element and then outwardly through a discharge spaced above the filter element. Secondly, when it is desired to cleanse the device, airlocks situated between the main filter chamber and a chamber therebelow, are released thus allowing the filter to empty downwardly carrying with it the sludge, floc, etc., into the chamber therebelow where upon it may be discharged therefrom with the liquid continuing to flow into the main chamber to flush same until it is changed back to the filtering mode. As the hydraulic head above the filter element flows downwardly through the filter element, it cleanses same in a back flushing action.

SUMMARY OF THE INVENTION

In accordance with the invention there is provided an upflow reactor filter assembly for liquids containing solids and/or flocculents, in conjunction with a source of compressed air; said assembly comprising in combination an enclosure, said enclosure including a secondary chamber at the base thereof with a primary chamber thereabove, a substantially horizontal partition floor separating said chambers, at least one airlock situated adjacent said floor and operatively extending between said chambers and forming an air/liquid interface between said chambers, an influent conduit terminating adjacent to but spaced above said floor for introducing influent liquid to be treated, into said primary chamber, air control means operatively extending from said secondary chamber to said airlock and being operatively connected to the source of compressed air for controlling the operation of said airlock, sludge discharge means operatively connected to said secondary chamber and a substantially horizontal filter element spanning said primary chamber spaced above said floor and treated effluent discharge means from said primary chamber situated above said filter element.

In accordance with another aspect of the invention, there is provided a method for removing solids and/or flocculents from a treated liquid comprising the steps of introducing the liquid into a primary chamber adjacent the base thereof, on a continuous basis, allowing some of the solids and/or flocculents to settle within said chamber by gravity, thus forming a mat, continuing to pass said liquid upwardly within said chamber and through said mat whereby said mat acts as a filter, passing said fluid from above said mat, through a comminuted particle filter and then discharging said filtered liquid through an outlet situated above said comminuted particle filter at a height sufficient to form a hydraulic head above said comminuted particle filter.

Another advantage of the invention is to provide a device of the character herewithin described which eliminates any moving parts during the filtering mode and also during the flushing mode with the exception of various valves.

A further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
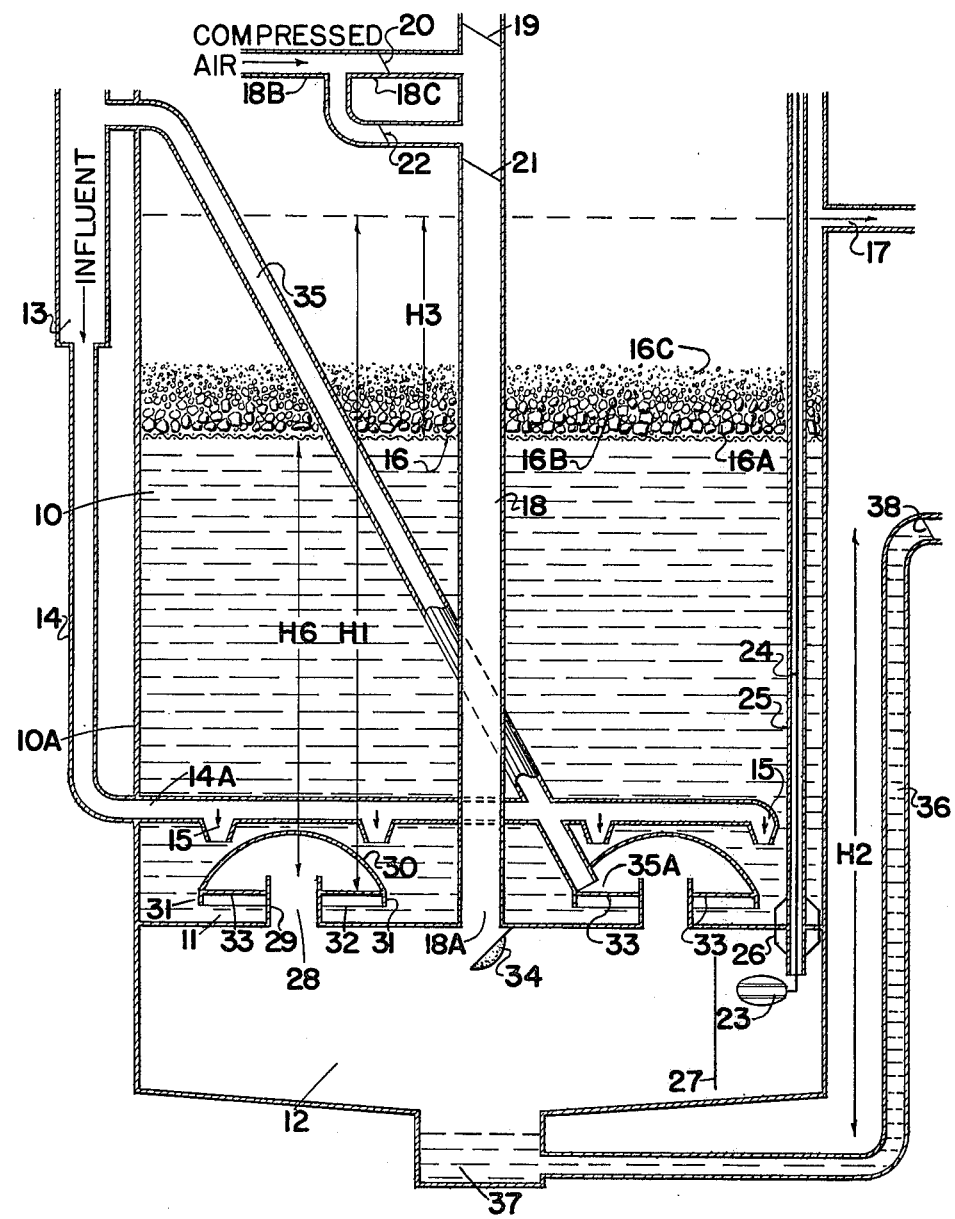
FIG. 1 is a schematic cross sectional view of the upflow reactor filter shown in the "treating liquid" mode.

Proceeding therefore to describe the invention in detail, the reactor filter is housed in an enclosure or housing 10A consisting of a primary vessel or chamber 10 of any convenient size or shape, which is provided with a false floor 11 and situated below vessel 10 is a smaller vessel or chamber 12 which controls flushing the filter and the withdrawal of sludge. The floor 11 divides the container with the two vessels or chambers 10 and 12.

Treating of Liquid—FIG. 1

The influent liquid enters a reservoir 13 and related distribution piping or conduits 14 and by gravity, flows to nozzles or jets 15. In a horizontal portion 14A nozzles 15 are similar and are situated so as to distribute the influent over the bottom or false floor 11 of primary vessel 10. The flow in the nozzles 15 is equalized by having the hydraulic loss of head through the nozzles much greater than the loss of head in the distribution piping 14.

The liquid then rises through the floc blanket formed in primary vessel 10, up to filter 16 spanning the primary vessel 10 adjacent the upper end thereof. Filter 16 is supported on a coarse screen 16A and consists of an initial layer of coarse particles 16B followed by successive layers of smaller particles 16C. The last layer is normally a much thicker layer of relatively small particles of uniform size. The size of the small particles is dependent on the liquid to be treated. The composition of all of the particles is also dependent on the liquid to be treated and may consist, for example, of stone grits or the like. The filter removes floating particles and, being designed to be uniform over the whole area, the loss of head through the filter, for any given rate of flow, is also the same over the whole area. As a result, the uniform vertical flow occurs over the whole area and no currents occur to hinder clarification below the filter by gravity separation of floc which settles within vessel 10 gradually building up from the floor 11 until the flushing cycle is initiated as will hereinafter be described. The same objective may be obtained by a membrane with designed perforations (not shown) but which is included in the term "filter" as used herewith and in the claims.

The head of the treated liquid, above filter 16, is retained for backflushing the filter, as required, and excess treated effluent is discharged continuously through outlet or overflow 17 situated above the filter 16 through the wall of the vessel or container 10.

A tube 18 is attached to the floor 11 between vessels or containers 10 and 12, with an open end 18A opening into vessel 12, passes through filter 16 and terminates above the outlet 17. Above the outlet 17, there are four valves attached to tube or conduit 18 which may be manually operated or, preferably, operated by timers, except the first valve 19 as will hereinafter be described.

(1) A relatively large valve 19 is provided at the upper end of tube or conduit 18, that can be opened and closed in a short period of time and vents to the atmosphere through the open upper end of tube 18. It is normally closed during the liquid treating or filtering mode.

(2) A smaller valve 20 is provided that can be opened for a controlled period of time and allows compressed air to flow into tube 18. A relatively small conduit 18C extends through the wall of tube 18 below valve 19 and also communicates with a source of compressed air indicated by arrow 18B.

(3) A mechanical valve 21 that can either throttle or close off flow of air is situated in conduit 18 below valve 19 and below the entrance of conduit 18C to conduit 18.

(4) A valve 22 that allows a small throttled flow of compressed air into tube 18 is situated in a conduit 22A that extends upstream of valve 20, to conduit 18 between valves 19 and 22.

A liquid level sensing device 23 is situated in secondary vessel or container 12 and, if electrical, transmits a signal at a certain predetermined height of liquid to close valve 19 and is operatively connected to valve 19 via cable 24, engaging through a tube 25 through which the signal from the liquid sensing device 23, is transmitted to the surface and which operatively connects to valve 19. Alternatively, the liquid level controller can be a float actuating valve 19 movable through linkage (not illustrated).

Where the tube 25 passes through the floor 11 between vessels 10 and 12, there is a gland 26 that allows the tube 25 to be raised or lowered without allowing liquid flow from vessel 10 to vessel 12. A baffle 27 is provided in vessel 12 partially shielding the liquid level sensing device 23 to stop wave action or turbulence of liquid in vessel 12 from affecting same.

A form of airlock 28 is provided in floor 11 in order to stop or control liquid flow to secondary vessel 12. It consists of a relatively large tube 29 through the floor 11 of primary vessel 10, covered by what is termed as an "inverted airtight basin or lock" 30 which is secured spaced above the floor by supports 31 and over the upper end of tube 19. However, the bottom of the inverted basin is clear of the floor 11, allowing liquid to flow freely under the basin 30. As the tube 29, through the floor 11, extends to well above the bottom or base 32 of the inverted basin 30, the liquid in tube 25 will be held at the level 33 shown in FIG. 1 (the air/liquid interface) provided that the air pressure in secondary vessel 12 exactly equals the hydraulic head H1 plus the resistance to the flow of liquid through filter 16 and the hydraulic head H2. This condition is maintained by controlling the flow of air through valve 22, which more than equals any leakage which might occur from secondary vessel 12.

A valve 34 is situated at the base of tube 18 with a float attached, which will be activated should valve 19 fail to close prior to liquid rising to that level, and controls flow into tube 18, and stops an airlift pump-type action taking place in this tube 18.

Tube 35 is a device to discharge any excess air. It inclines down from the upper end of the reservoir 13 and terminates adjacent the air/liquid interface or fluid level 33. When the air/liquid interface 33 drops below the upper edge 35A of the lower end of the tube 35, air will enter tube 35, displacing the liquid which normally is at the same level as the liquid above the filter 16 which provides the head H3. The mixture of air and liquid in tube 35 will reduce the total weight of water in the tube and result in liquid and air rising as in an airlift pump. The rate of such flow will be controlled by a series of baffles in tube 35 (not illustrated) so as to slow the flow, and tube 35 will be set at an angle and be of such a size that air bubbles will tend to travel up the high side of the tube. Any flow from tube 35 will be directed to reservoir 13 where it will mix with the influent and seed the incoming liquid with sludge from the base of chamber 10 thus assisting in the flocculating process.

A discharge pipe or conduit 36 extends from a sump 37 in the base of secondary vessel 12 and extends upwardly outside the vessels 10 and 12 to a height giving a head H2. It allows discharge of liquid from the sump 37 at the bottom of vessel 12, when the pressure in vessel 12 exceeds the head differential between vessel 12 and the point of discharge.

It is provided with a valve 38 that can throttle flow from vessel 12 through pipe or conduit 36.

Figure 2:
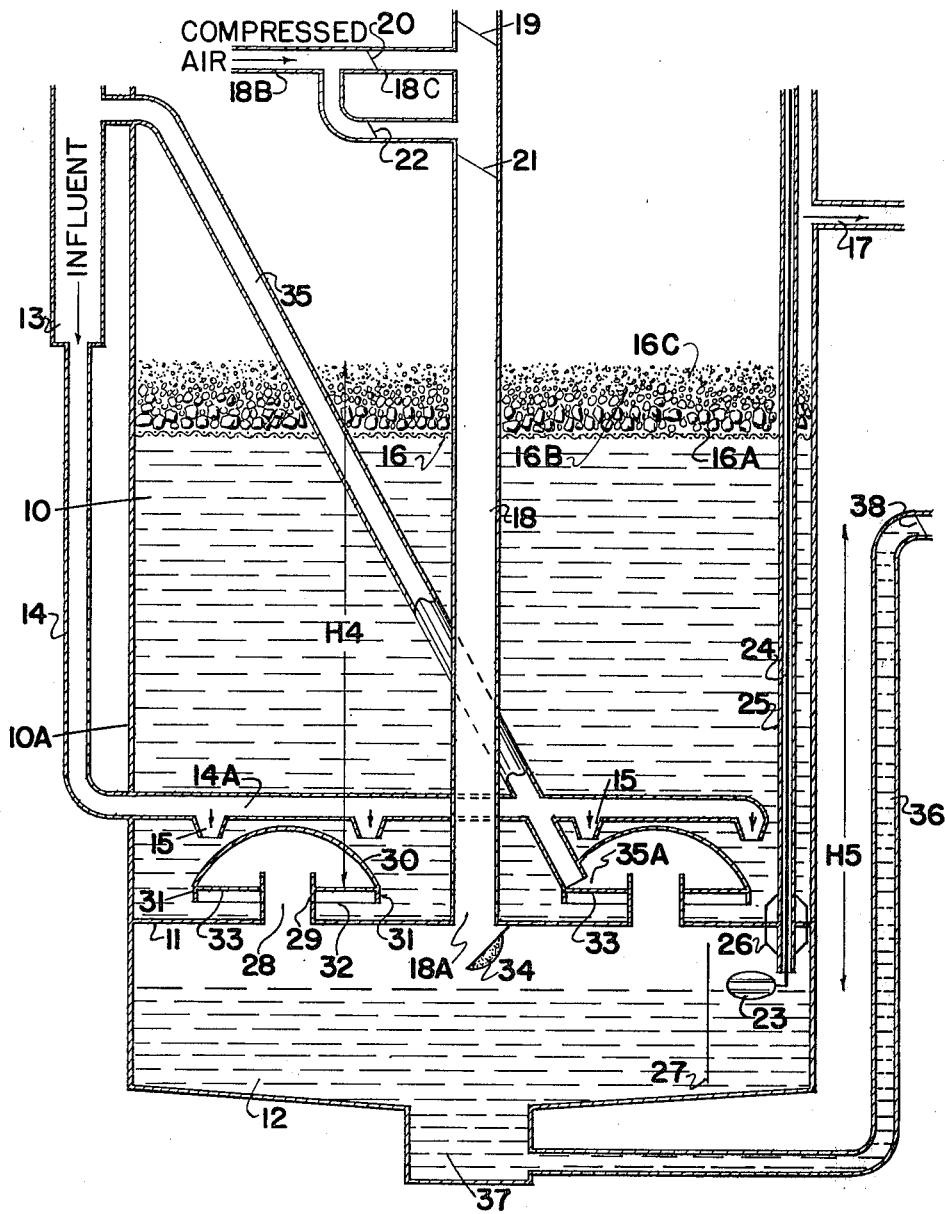
FIG. 2 is a view similar to FIG. 1 but showing the mode after filter flushing has been completed.

Flushing of Filter and Withdrawing Sludge and Floc Blanket—FIG. 2

When it is necessary to flush the filter 16 and withdraw sludge, the following sequence will occur:

Valve 19 will be opened over-riding control 23, and compressed air from secondary vessel 12 will be vented through tube 18. Once the air pressure in airlocks 28 is decreased below head H1, the liquid and sludge in primary vessel 10 will pass into secondary vessel 12 via tubes 29 expelling by displacement, more air through tube 18, until the liquid level device 23 is raised (if manual, or actuated if electrical), which initiates the closing of valve 19. Flow will continue through locks 28 until the air is compressed in chamber or vessel 12 (and tube 18) to exactly equal the new hydraulic head H4 as shown in FIG. 2.

When this state is reached, the flushing cycle through filter 16 is completed, liquid continues to flow down from reservoir 13 and valve 20 is opened, allowing a controlled additional flow of air into tube 18. This air will increase in pressure in secondary vessel 12 to compensate for the fact that the liquid will rise in primary vessel 10, resulting in H4 increasing towards H1. Further, whenever H4 exceeds H5, which is shown in FIG. 2 to be the difference in elevation of the sludge in vessel 12 and the discharge point of pipe 36, sludge will be discharged. The rate of discharge will be controlled by valve 38, at any convenient rate for disposal and at a lesser rate than the volume of compressed air entering vessel 12. When sludge discharge is complete, valve 20 will close, returning the filter to normal operation.

The device has the following advantages:

(1) large volumes of sludge can be discharged from primary vessel 10 in a short time without any movable device being in contact with the liquid.

(2) the filter is flushed by a relatively small amount of water which is drawn rapidly through the filter in the following manner:

A filter has a resistance to flow depending on the particle size, thickness of filter and its area. Presume filter 16 allows a flow of Y/cubic feet per second under head H3 (see FIG. 1).

Presume there are sufficient devices or airlocks 28 of appropriate size and tube 18 releases air at a sufficient rate, Y2 cubic feet per second of water could flow into secondary vessel 12 with a head loss H3. If the design was such that Y2 was greater than Y1 the following condition would occur.

The absolute pressure at any point in a liquid at rest is equal to atmospheric pressure at the surface plus the depth below the surface. As the liquid travels through the filter and the devices 28, the head loss through the filter will be greater than head loss through the devices 28, therefore the head loss through the filter will be greater than head H3 and less than H3+H6 by the head loss through devices 28. As the losses in devices 28 are designed to be less than the losses in the filter, the head loss through the filter will be greater than H3 and the resultant increase in velocity will assist in cleaning the filter.

The head loss through filter 16 can be increased by increasing the height of vessel 10 and decreasing the friction losses through devices 28 to the point where the head loss through filter 16 is equal to atmospheric pressure less the vapour pressure of the liquid. Further, should operating experience show that it is advisable to retain a certain amount of floc adhering to the filter, the rate can be decreased by using valve 21 to throttle the release of air from secondary vessel 12.

(3) by raising or lowering tube 25 and sensing device 23, the quantity of sludge removed at any one flushing cycle can be altered without stopping the process.

(4) the considerable drop in pressure occurring at the time of flushing at the bottom of vessel 10 will greatly increase velocity through nozzles or jets 15 and, by varying the size of reservoir 13, these jets can be flushed by as great a volume as considered necessary to keep them clear.

(5) this device not only uses a small amount of treated water to flush the filter, but this water, which is still partially treated, then rises through the filter and is not wasted.

(6) this device only discharges treated liquid and sludge whereas normal devices discharge large volumes of contaminated water from flushing the filter.

(7) the filter 16 has larger particles where the water enters, and smaller for the final filtration with the advantage of trapping larger particles in the coarse material. In normal filters this can only be achieved by having the larger particles with a lower specific gravity than the smaller particles.

(8) the sludge is expelled from secondary vessel 12 at any convenient rate, provided all sludge has been expelled from this vessel 12 prior to the next flushing cycle.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An upflow reactor filter assembly for liquids containing solids and flocculents, in conjunction with a source of compressed air; said assembly comprising in combination an enclosure, said enclosure including a secondary chamber at the base thereof with a primary chamber thereabove, a substantially horizontal partition floor separating said chambers, at least one airlock situated adjacent said floor and operatively extending between said chambers and forming an air/liquid interface between said chambers, an influent conduit terminating adjacent to but spaced above said floor for introducing influent liquid to be treated, into said primary chamber, air control means operatively extending from said secondary chamber to said airlock and being operatively connected to the source of compressed air for controlling the operation of said airlock, sludge discharge means operatively connected to said secondary chamber and a substantially horizontal filter element spanning said primary chamber spaced above said floor and treated effluent discharge means from said primary chamber situated above said filter element, said air control means including a standpipe operatively extending upwardly from said floor and communicating therethrough with said secondary chamber, said standpipe extending above said treated effluent discharge means, valve means adjacent the upper end of said standpipe controlling communication of said standpipe with the atmosphere and further valve means adjacent the upper end of said standpipe and below said first mentioned valve means selectively and operatively connecting said standpipe with the source of compressed air, said airlock including said floor being apertured, a tube defining said aperture and extending upwardly into said primary chamber, an inverted airlock cover component supported above and over the upper end of said tube with the lower rim of said cover component being situated at a level below the upper end of said tube and means to support said cover component in position, the air/fluid interface within said cover component being controlled by the pressure of air within said chamber during the filtering process.

2. The invention according to claim 1 in which said effluent discharge means is situated spaced above said filter element a sufficient amount to provide a hydraulic head of treated effluent above said filter element.

3. The invention according to claim 2 in which said filter assembly is selectively operable in a liquid treating mode and a flushing and sludge withdrawal mode, and means to change said assembly from one mode to the other.

4. The invention according to claim 2 which includes a sludge sump in the base of said secondary chamber and a vertically situated sludge discharge pipe extending from said sump exteriorly of said enclosure and having a discharge head height below the level of said filter element.

5. The invention according to claim 3 which includes a sludge sump in the base of said secondary chamber and a vertically situated sludge discharge pipe extending from said sump exteriorly of said enclosure and having a discharge head height below the level of said filter element.

6. The invention according to claim 5 which includes an air/liquid release conduit extending from adjacent the air/liquid interface in said airlock and inclining upwardly to be connected to said influent conduit at a location spaced above said effluent discharge means, the lower end of said release conduit normally being slightly below said interface and releasing air and liquid together with said sludge, for seeding the influent liquid, when said air/liquid interface drops a predetermined amount at the commencement of said flushing and sludge removal mode.

7. The invention according to claim 3 which includes an air/liquid release conduit extending from adjacent the air/liquid interface in said airlock and inclining upwardly to be connected to said influent conduit at a location spaced above said effluent discharge means, the lower end of said release conduit normally being sightly below said interface and releasing air and liquid together with said sludge, for seeding the influent liquid, when said air/liquid interface drops a predetermined amount at the commencement of said flushing and sludge removal mode.

8. The invention according to claims 5, 7 or 6 in which said filter element includes a substantially horizontally situated, relatively coarse, screen and a body of comminuted filter material above said screen, said filter material decreasing in particle size from the said coarse screen upwardly to the upper side of said body of comminuted filter material.

9. The invention according to claim 1 in which said filter assembly is selectively operable in a liquid treating mode and a flushing and sludge withdrawal mode, and means to change said assembly from one mode to the other.

10. The invention according to claim 9 which includes an air/liquid release conduit extending from adjacent the air/liquid interface in said airlock and inclining upwardly to be connected to said influent conduit at a location spaced above said effluent discharge means, the lower end of said release conduit normally being slightly below said interface and releasing air and liquid together with said sludge, for seeding the influent liquid, when said air/liquid interface drops a predetermined amount at the commencement of said flushing and sludge removal mode.

11. The invention according to claim 9 which includes a sludge sump in the base of said secondary chamber and a vertically situated sludge discharge pipe extending from said sump exteriorly of said enclosure and having a discharge head height below the level of said filter element.

12. The invention according to claim 1 which includes a sludge sump in the base of said secondary chamber and a vertically situated sludge discharge pipe extending from said sump exteriorly of said enclosure and having a discharge head height below the level of said filter element.

13. The invention according to claims 1, 2 or 9 in which said filter element includes a substantially horizontally situated, relatively coarse, screen and a body of comminuted filter material above said screen, said filter material decreasing in particle size from the said coarse screen upwardly to the upper side of said body of comminuted filter material.

14. The invention according to claims 3, 12 or 10 in which said filter element includes a substantially horizontally situated, relatively coarse, screen and a body of comminuted filter material above said screen, said filter material decreasing in particle size from the said coarse screen upwardly to the upper side of said body of comminuted filter material.

15. The invention according to claims 13, 4 or 11 in which said filter element includes a substantially horizontally situated, relatively coarse, screen and a body of comminuted filter material above said screen, said filter material decreasing in particle size from the said coarse screen upwardly to the upper side of said body of comminuted filter material.

* * * * *